United States Patent
Ianev

(10) Patent No.: US 8,130,665 B2
(45) Date of Patent: Mar. 6, 2012

(54) LOAD SHARING IN MOBILE RADIO COMMUNCATIONS NETWORK

(75) Inventor: Iskren Ianev, Berkshire (GB)

(73) Assignee: NEC Corporation, Tokyo (JP)

( * ) Notice: Subject to any disclaimer, the term of this patent is extended or adjusted under 35 U.S.C. 154(b) by 74 days.

(21) Appl. No.: 12/312,174

(22) PCT Filed: Nov. 16, 2007

(86) PCT No.: PCT/JP2007/072698
§ 371 (c)(1),
(2), (4) Date: Jun. 15, 2009

(87) PCT Pub. No.: WO2008/059994
PCT Pub. Date: May 22, 2008

(65) Prior Publication Data
US 2010/0067375 A1  Mar. 18, 2010

(30) Foreign Application Priority Data
Nov. 16, 2006  (GB) .................................. 0622877.9

(51) Int. Cl.
H04L 12/26  (2006.01)
(52) U.S. Cl. ........................................ 370/252; 370/349
(58) Field of Classification Search .............. 370/310.2, 370/328, 329, 338, 252, 349, 331, 347, 335; 455/432.3, 464, 515, 449, 434, 438, 524, 455/525, 435.2
See application file for complete search history.

(56) References Cited

U.S. PATENT DOCUMENTS
2005/0090278 A1 * 4/2005 Jeong et al. .................. 455/525
2006/0142021 A1   6/2006 Mueckenheim et al.

FOREIGN PATENT DOCUMENTS
JP  2006-191592   7/2006

OTHER PUBLICATIONS
T-Mobile, Load Sharing using Cell Reselection (R2-061238, 3GPP TSG RAN WG2#53), meeting, Shanghai, China, May 8-12, 2006.

* cited by examiner

*Primary Examiner* — Brenda H Pham
(74) *Attorney, Agent, or Firm* — McGinn IP Law Group, PLLC

(57) ABSTRACT

The present invention relates to a method of providing load sharing through network controlled cell reselection in a mobile radio communications network, including delivering an offset parameter to User Equipment within the network for biasing the said reselection, the method further including the step of broadcasting the offset parameter to the User Equipment within system information and so as to be cell-specific, further delivering load-sharing-priority-keys and subsequently processing the offset parameter with the load-sharing-priority-keys so as to become User Equipment specific.

7 Claims, 2 Drawing Sheets

LOAD SHARING IN MOBILE RADIO COMMUNCATIONS NETWORK

Figure 1:
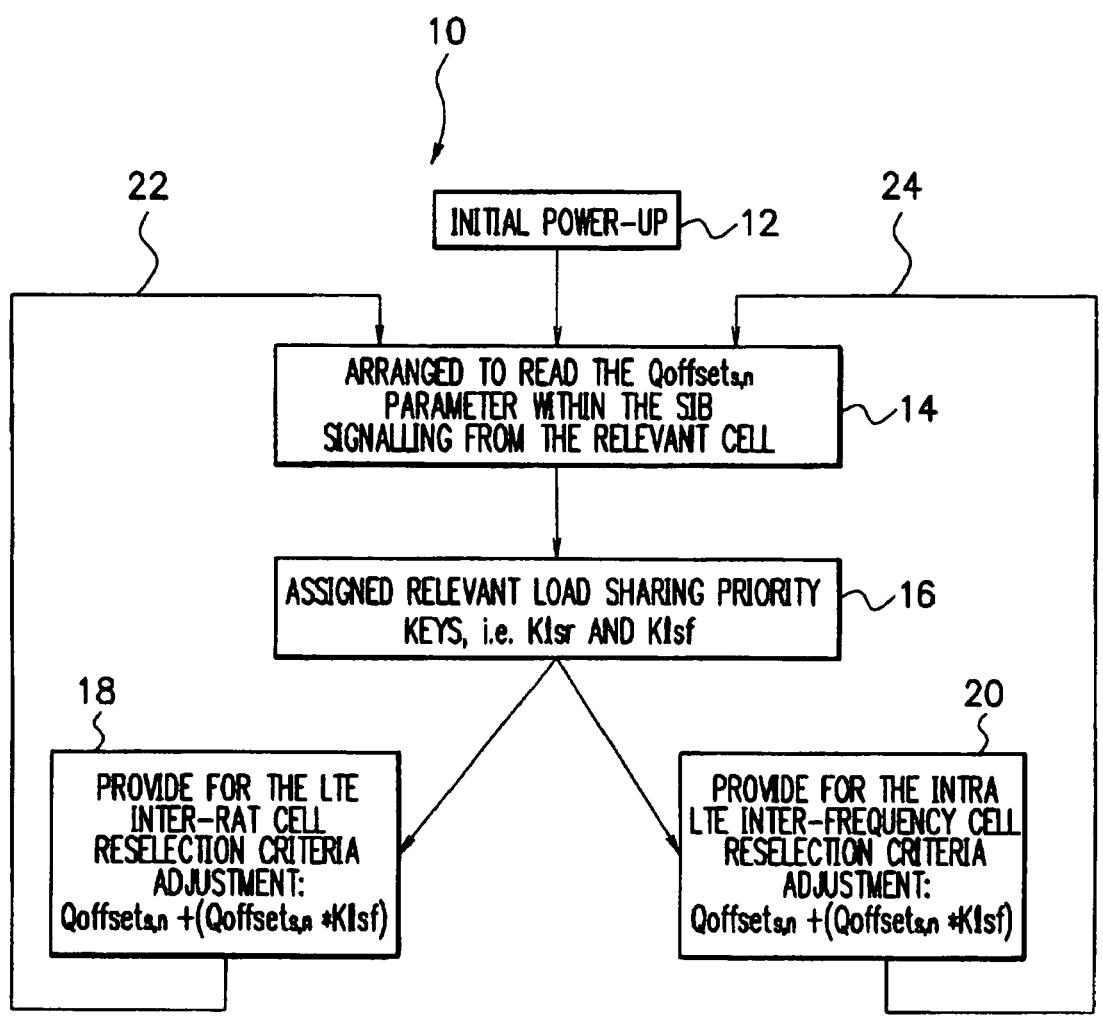

The present invention relates to a method of providing load sharing through cell reselection procedures within a mobile radio communications network, and to a related mobile radio communications device.

BACKGROUND OF THE INVENTION

In order to effectively react to, and control, the volume of traffic arising in relation to mobile radio communications networks, arrangements for achieving load-sharing between the various Radio Access Technology (RAT) networks have been introduced. These arrangements can serve to manage the distribution of data traffic between the various networks in an attempt to at least reduce the likelihood of an overload condition arising which would of course have a detrimental effect on overall system performance.

While it has proved readily possible to control such load sharing when User Equipment (UE) is in an active, or connected, state/mode, such control has not been available while the UE is in an inactive, or idle, state/mode.

However, proposals made in relation to the $3^{rd}$ Generation Partnership Project (3GPP) have identified the desirability for achieving and controlling load sharing while the UE is in an inactive/idle state/mode.

As one particular example, reference is made to existing GSM/EDGE Radio Access Networks (GERAN) and UMTS Terrestrial Radio Access Network (UTRAN) mixed networks, and in which there is currently no load sharing for UE available between those networks while the UE is in an idle mode. Indeed, the UE controlled cell reselection procedures operate quite independently of any service, or subscriber, specific considerations. Thus, if a situation should arise in which service, or subscriber, differentiation is required for traffic steering between GERAN and UTRAN, it is necessary to wait until the UE has entered a connected state/mode and in which the network controls the mobility by way of handover, or cell change, order procedures. While within the particular example of the GERAN/UTRAN environment, such an arrangement generally works well since the traffic to be steered generally comprises voice, rather than data, and the user is unlikely to notice which of the two network possibilities actually comprises the serving network. The data services, will be handled on the UTRAN since this has a higher data capacity. Thus, in the specific example discussed above of the GERAN/UTRAN mixed environment, the required load sharing is introduced primarily for voice traffic and, again with the UE in a connected state/mode, the data traffic is retained on the UTRAN side.

With regard to future developments, and the expected deployment of Evolved-UTRAN (E-UTRAN), as a capacity overlay for the UTRAN, the existing UTRAN is likely to remain utilised for data services whilst Long Term Evolution (LTE) handset usage increases. Since both E-UTRAN and UTRAN networks support relatively high speed data services, the performance differential between E-UTRAN and UTRAN is likely to be smaller than that arising between GERAN and UTRAN. In view of this, and with regard to likely future deployment of E-UTRAN, it can be seen as a potential advantage to provide for an efficient load latency arrangement for achieving packet switched data load-sharing between a UTRAN and E-UTRAN. Indeed, it has been acknowledged in relation to LTE requirements within document 3GPP 25.913 that support for load sharing and policy management across different RATs should be considered such as in particular, reselection mechanisms to direct UEs towards appropriate RATs when the UEs are in a dormant, i.e. inactive or idle, mode as well as when in an active mode/state.

This intention as illustrated in the above-mentioned 3GPP document is to ensure that LTE does not inherit the restrictions of UTRAN and that UE-controlled reselection algorithms for LTE devices can be managed by the network so that the network can move specific users from, for example, E-UTRAN to UTRAN or any other RAT when in an idle mode/state.

One known attempt to meet such a requirement was outlined in R-061238 during the 3GPP RAN2#53 meeting in Shanghai on 8-12 May 2006. This proposal was directed to the UTRAN environment and employed the $Qoffset_{s,n}$ parameter which is employed to bias reselection between a given pair of cells as is described further in 3GPP TS 25.304. As is known, this parameter is broadcast within the System Information Block (SIB) signalling, and in particular the SIB3 and SIB4 messages. The particular proposal relates to the addition of a UE-specific inter-RAT offset parameter which is introduced so that it can be provided to the UE by way of dedicated Radio Resource Controller (RRC) signalling. Once received, the offset value is then added, by the UE, to the particular broadcast $Qoffset_{s,n}$ values for all, or alternatively specific cell relations. This inter-RAT offset will apply for the duration of a timer to all, or specific, inter-RAT relationships and is also to be applied while the UE is camped on other RATs in order to prevent a ping-pong effect arising between the different RATs.

This known proposal provides for UE specific mobility between RATs by means of network-controlled cell reselection in idle mode and so there is no need for the network to push the UE into an RRC connected state in order to trigger a change of RAT for any particular UE.

It is considered however that such a known proposal exhibits limitations and inefficiencies that can lead to load-sharing performance problems.

SUMMARY

The present invention therefore seeks to provide a method of enabling load sharing through network controlled cell reselection, and to related UE, having advantages over known such methods and UEs.

According to one aspect of the present invention, there is a method of providing load sharing through cell reselection in a mobile radio communications network, including delivering an offset parameter to User Equipment within the network for biasing the said reselection, the method further including the step of broadcasting the offset parameter to the User Equipment within system information and so as to be cell-specific, and subsequently processing the offset parameter with a load-sharing-priority-key so as to become User Equipment specific.

The invention can prove advantageous insofar as simplified load-sharing is provided in that there is no need for dedicated RRC signalling.

Preferably, the load sharing priority key is assigned by the network during a registration procedure.

Such delivery, as above, removes the need for dedicated RRC signalling and, in particular, the key can be delivered not only during registration, but also during re-registration procedures.

In an alternative embodiment, the load sharing priority key can be loaded to the SIM of the User Equipment as an alternative to delivery during the registration procedure.

Advantageously, the load sharing priority key is related to the user profile.

As an alternative, or addition, the load sharing priority key can be related to a subscription profile.

In one particular embodiment, the offset parameter comprises a $Qoffset_{s,n}$ parameter.

Advantageously the processing step can include multiplying the said parameter by the load sharing priority key.

In particular, the result of such multiplication is itself added to the offset parameter value so as to arrive at a final offset value.

According to one embodiment, the load sharing priority key is arranged for load sharing between different RATs.

Also, the load sharing priority key can be arranged for RAT inter-frequency load sharing.

According to another aspect of the present invention there is provided a mobile radio communications device arranged for receiving an offset parameter for use in cell-reselection load sharing, the device further being arranged to receive the offset parameter within system information and further including means for processing the said offset parameter with a load sharing priority key.

In this manner, the offset parameter initially received by the device within the system information is cell-specific, whereas the processing of the offset parameter with the load sharing priority key results in a device specific parameter.

BRIEF DESRIPTION OF THE DRAWINGS

Figure 2:
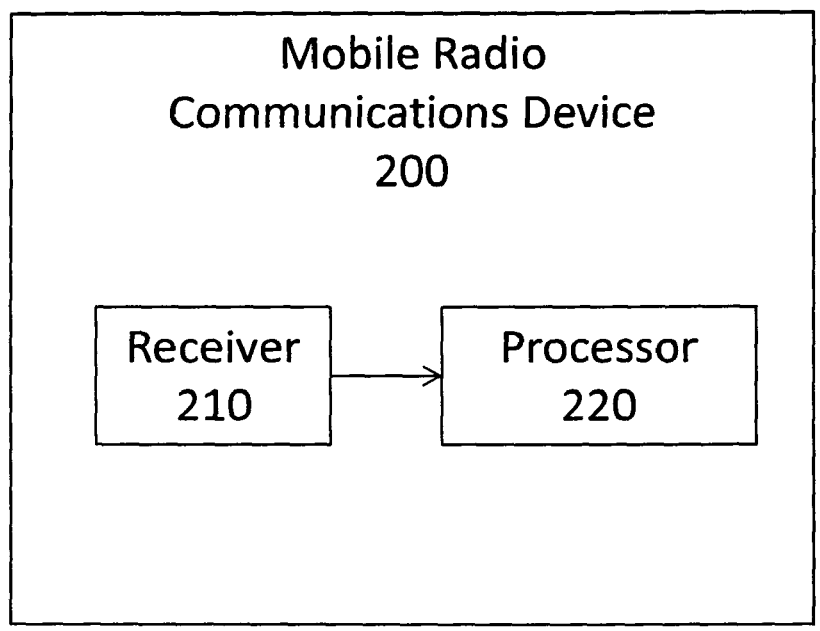

FIG. 1 is a schematic flow diagram illustrating the network control of cell reselection in accordance with an embodiment of the present invention; and FIG. 2 illustrates a mobile radio communications device, according to an exemplary aspect of the present invention.

DETAILED DESCRIPTION OF THE
EXEMPLARY EMBODIMENTS OF THE
INVENTION

Again the invention as embodied in the device can prove advantageous insofar as simplified load-sharing is provided in that there is no need for dedicated RRC signalling.

As before, the load sharing priority key is preferably assigned by the network during a registration procedure. Such delivery, as above, removes the need for dedicated RRC signalling and, in particular, the key can be delivered not only during registration but also re-registration procedures.

The load sharing priority key can of course be loaded to the SIM of the User Equipment device as an alternative to delivery during the registration procedure.

Advantageously, the load sharing priority key is related to the user profile.

As an alternative, or addition, the load sharing priority key can be related to a subscription profile.

In one particular embodiment, the offset parameter comprises a $Qoffset_{s,n}$ parameter and, as a processing step, can include multiplying the said parameter by the load sharing priority key.

In particular, the parameter resulting from such multiplication is itself added to the parameter so as to arrive at a final offset value.

According to one embodiment, the load sharing priority key is arranged for load sharing between different RATs.

Alternatively, the load sharing priority key can be arranged for RAT inter-frequency load sharing.

The invention is described further hereinafter, for example only, with reference to FIG. 1 which comprises a schematic flow diagram illustrating the network control of cell reselection in accordance with an embodiment of the present invention.

As will be appreciated, while the present invention can find a variety of network applications, the embodiment discussed below, and as illustrated in the accompanying drawing, relates to the LTE environment and, in particular, the likely deployment of E-UTRAN and UTRAN networks.

As is currently known, within the UTRAN environment the $Qoffset_{s,n}$ parameter is employed for biasing reselection between a given pair of cells. This parameter is commonly broadcast within SIB3 and SIB4 messages.

As will be appreciated from the following discussion and accompanying drawings, this embodiment of the invention involves the assignment of an LTE inter-RAT load sharing priority key and which is assigned to each UE from the network in the registration process such as IMSI attach and could be updated during any re-registration procedures such as RA update etc. This key introduces the required subscriber differentiation in the traffic steering.

Within the User Equipment, the existing broadcast value of $Qoffset_{s,n}$ is multiplied by the load sharing priority key and added as an additional offset in the cell reselection criteria for the relevant inter-RAT relations only. That is, the final offset value is:

$$Qoffset_{s,n} + (Qoffset_{s,n} * Klsr)$$

where

Klsr is the LTE iner-RAT load sharing priority key.

Employment of the additional offset in this manner provides for subscriber differentiation in the traffic steering and which is based upon a subscriber specific consideration profile.

It should be appreciated that a similar procedure can also be applied while the UE is camped-on some other RAT in order that a ping-pong effect between the RATs is avoided.

As illustrated in FIG. 1 and discussed further below, the aforementioned example of the concept of the present invention is also applicable to intra LTE inter-frequency case:

$$Qoffset_{s,n} + (Qoffset_{s,n} * Klsf)$$

where

Klsf is the load sharing priority key between frequencies.

Advantageous control of load sharing while the UE is in idle mode can likewise therefore be achieved by way of the present invention but, as compared with the known art, by means of much improved, and more efficient, arrangement.

As will be appreciated, the cell reselection offset parameter is broadcast within the system information which advantageously renders the offset cell-specific. This is then processed with the appropriate key Klsr or Klsf so that the offset advantageously then becomes UE specific.

As compared with the known art, in which the offset is initially UE specific, and is delivered by means of dedicated RRC signalling, the present invention provides for simplified load sharing insofar as there is no need for dedicated RRC signalling since the relevant keys Klsr and Klsf are delivered during the registration or re-registration process.

Also, more flexible load sharing is available since the use of Klsr or Klsf keys for making the offset parameters UE specific, adds flexibility to the present invention.

These constant key values can be supplied by the Core Network during the registration procedure and can likewise be related to user profile or subscription profile.

As noted above, a further alternative is that the relevant keys Klsr and Klsf are loaded into the SIM of the User Equipment and this serves to avoid the need for delivery of the key during the registration procedure.

Turning now to FIG. 1, there is illustrated a procedure 10 in which a required offset value is advantageously provided to User Equipment so as to allow for load-sharing when the User Equipment is in an idle mode.

The procedure 10 commences at step 12 at initial power-up for the User Equipment.

As an alternative, step 12 can arise during a return from a "no-service" environment.

During a camping-on procedure at step 14, the User Equipment is arranged to read the $Qoffset_{s,n}$ parameter within the SIB signalling from the relevant cell.

During registration, at step 16, the User Equipment is assigned relevant load sharing priority keys, i.e. Klsr and Klsf.

Depending upon whether the new cell, considered for reselection to, belongs to a new RAT or new frequency within the same RAT, the process continues back to step 14 via step 18 or step 20.

If LTE inter-RAT cell reselection is considered, then the procedure continues to step 18 so as to provide for the LTE inter-RAT cell reselection criteria adjustment:

$$Qoffset_{s,n} + (Qoffset_{s,n} * Klsr)$$

The process then returns via 22 to the camping-on step 14.

If however intra LTE inter-frequency cell reselection is considered, then the procedure continues to step 20 so as to provide for the intra LTE inter-frequency cell reselection criteria adjustment:

$$Qoffset_{s,n} + (Qoffset_{s,n})$$

The process then continues via step 24 to the camping on step 14.

Thus, as will be appreciated, cell reselection criteria can be adjusted provided in accordance with the present invention which allows for load-sharing between different RATs and between different frequencies within LTE even with the user equipment in an idle or inactive, mode/state.

FIG. 2 illustrates a mobile radio communications device 200 which includes a receiver 210 for receiving an offset parameter for use in cell-reselection load sharing, the receiver 210 being arranged to receive the offset parameter within system information. The device 200 further includes a processor 220 for processing the offset parameter with a load sharing priority key.

The limitations previously experienced when seeking to provide for load sharing while in idle mode can therefore be avoided.

This application is based upon and claims the benefit of priority from GB patent application No. 0622877.9 filed on Nov. 16, 2007, the disclosure of which is incorporated herein in its entirety by reference.

The invention claimed is:

1. A mobile radio communications device, comprising:
    a receiver for receiving an offset parameter for use in cell-reselection load sharing, the receiver being arranged to receive the offset parameter within system information; and
    a unit that processes said offset parameter so as to be specific to the device by use of a load sharing priority key assigned to the device.

2. The device as claimed in claim 1, wherein the receiver is arranged to receive the load sharing priority key from a network during a registration procedure.

3. The device as claimed in claim 1, wherein the receiver is arranged to receive the load sharing key via a subscriber identification module (SIM) mounted on the device.

4. The device as claimed in claim 1, wherein the offset parameter comprises a $Qoffset_{s,n}$ parameter.

5. The device as claimed in claim 1, wherein the unit processes said offset parameter by multiplying a value of said offset parameter by a value of the load sharing priority key.

6. The device as claimed in claim 5, wherein the unit further processes said offset parameter by adding a result of said multiplying to the value of the offset parameter.

7. A mobile radio communications device, comprising:
    a receiver for receiving an offset parameter for use in cell-reselection load sharing, the receiver being arranged to receive the offset parameter within system information; and
    means for processing said offset parameter so as to be specific to the device by use of a load sharing priority key assigned to the device.

* * * * *